Sept. 2, 1930.  C. H. KEELER  1,774,832
COMBINED LUMINOUS OPHTHALMOSCOPE AND RETINOSCOPE
Filed June 1, 1927

Inventor
Charles Henry Keeler
By
Pennie, Davis, Marvin & Edmonds
Attorneys

Patented Sept. 2, 1930

1,774,832

UNITED STATES PATENT OFFICE

CHARLES HENRY KEELER, OF STANWELL, ENGLAND

COMBINED LUMINOUS OPHTHALMOSCOPE AND RETINOSCOPE

Application filed June 1, 1927, Serial No. 195,614, and in Great Britain July 8, 1926.

The present invention relates to an instrument for facilitating the examination of the eye, of the type in which a beam of light from a suitable source is reflected into the eye from a mirror having a small aperture through which the desired observation may be made, the chief object of the invention being to enable a single instrument to be employed either as an ophthalmoscope or as a retinoscope.

The invention consists in an instrument of the type set forth in which the beam of light is passed through a system of lenses which may be varied so that the beam finally projected into the eye is either divergent, parallel or convergent. The desired variation may be produced either by the provision of lenses which may be readily inserted into or withdrawn from the path of the beam or by making one or more of the lenses adjustable in the direction of the beam.

In order that the invention may be clearly understood and readily carried into effect it will now be described more fully, by way of example, by reference to the accompanying drawing, which illustrates a form of the instrument in which a combination of the methods of varying the lens system above referred to is employed, and in which:—

Figure 1:
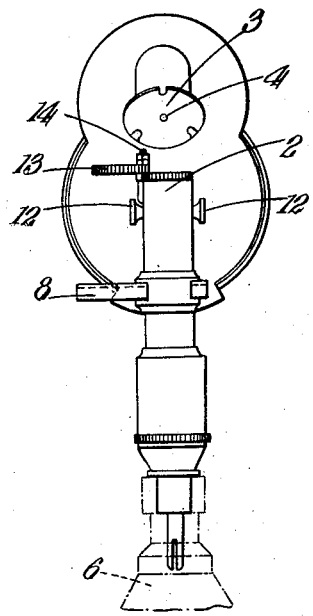
Figures 1 and 2 are respectively front and side elevations.
Figure 2:
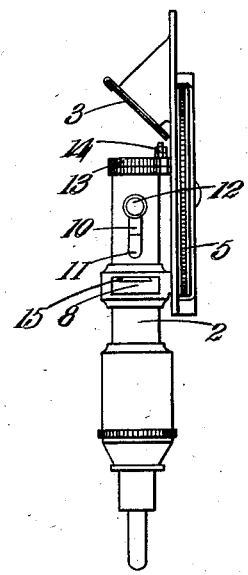

In general form the instrument is of known type in which a source of light, such as an electric bulb 1, is contained within a tube 2 and is adapted to direct a beam of light on to a mirror 3 inclined at 45° to the axis of the tube 2 and provided with a central aperture 4 for observation purposes, a disc 5 fitted with a series of lenses, any one of which may be brought into line with the aperture 4, being also provided. The whole is conveniently mounted on a cylindrical or like handle 6, which may serve to contain a dry battery to supply the lamp, or, in the case in which it is desired to connect the lamp to the mains, a resistance for cutting down the supply voltage to a suitable value.

The light from the lamp 1 is passed through a system of lenses fitted in or to the tube 2, each of these lenses being, if desired, built up of two or more simple lenses. The lens 7 situated nearest to the lamp 1 is fitted in a slide 8, whereby it may be projected on to the axis of the tube 2 or withdrawn therefrom, the slide, however, having an aperture so that in the position in which the lens 7 is withdrawn the light is not obscured. A second lens 9 is carried by a short length of tube 10 mounted so as to slide within the tube 2, the motion being limited by means of pins projecting through slots 11 and securing screws 12 being provided, if desired. A third lens 13 is carried in a socket pivoted at 14 so that it may be placed coaxially with the tube 2 or withdrawn from the path of the beam of light to the position indicated in Figure 1.

Figure 3:
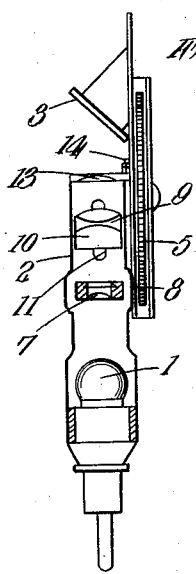
Figures 3 and 4 are sections depicting different adjustments of the lens system.
Figure 4:
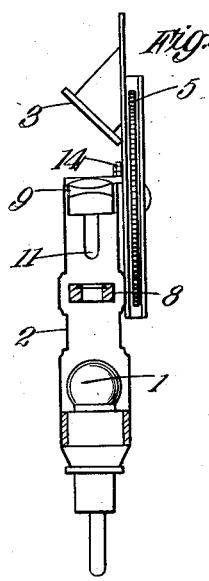

As indicated in Figure 3 all of the lenses 7, 9 and 13 may be employed, the lens 9 being placed as near as possible to the lamp 1 or intermediately, as shown, and in that case the beam projected from the mirror 3 will be divergent, making the instrument suitable for use as an ophthalmoscope. If the lens 9 be maintained in the same position but the lenses 7 and 13 be withdrawn the projected beam will be either parallel or very slightly divergent, such as is required for use in retinoscopy. If it be desired to examine the eye at a distance, say of one metre, the arrangement indicated in Figure 4 may be adopted, that is to say, the lenses 7 and 13 being withdrawn, the lens 9 is moved as far away from the lamp 1 as possible and the projected beam will then be slightly convergent, being brought to a focus approximately one metre from the mirror 3. If a strongly convergent beam be required, such as, for example, for the purpose of examining the cornea or the anterior chamber, the lens 9 would be adjusted to its position nearest to the lamp 1 or to any intermediate position and the lens 13 introduced into the beam. Under these conditions the light is brought to a focus at a comparatively short distance, for example, three centimetres from the mirror 3. It will be obvious that with the various combinations and arrangements of lenses which are possible a large variation in the concentration or diffusion of the beam can be obtained.

Figure 5:
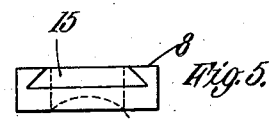
Figures 5 and 6 illustrate a detail to an enlarged scale.
Figure 6:
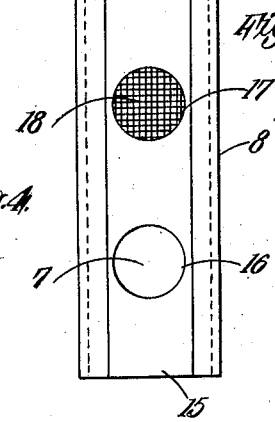

As shown in Figures 5 and 6, provision may be made for introducing into the slide 8 a graticule or other transparency whereby a corresponding image may be thrown on the retina or any other desired portion of the eye. For this purpose the slide 8 may be fitted with a secondary slide 15 having apertures or sockets 16 and 17 adapted respectively to register with the lens 7 and with the aperture in the slide 8, the graticule 18 or the like being fixed in either of the apertures or sockets 16, 17. Alternatively, the secondary slide 15 may be of such a length as to extend over a portion only of the slide 8 sufficient to enable the graticule or the like to register either with the aperture in the slide 8 or with the lens 7, the aperture 16 being then unnecessary. Further, it will be obvious that any other suitably mounted object may be similarly placed in the aperture or socket 16 or 17 or mounted in a separate secondary slide to be substituted for that shown and an enlarged image thereof thereby projected either on to or into the eye or on to a suitable screen placed in the path of the beam projected from the mirror 3.

What I claim and desire to secure by Letters Patent of the United States is:—

1. An instrument for the production of a beam of light of varying characteristics, comprising in combination a source of light, a series of lenses so disposed that a beam of light from said source passes through them seriatim, a reflecting surface inclined to the axis of said lenses, means for adjusting the position of one of said lenses in the direction of said axis, a graticule, and means whereby said graticule may be projected into or withdrawn from said beam of light.

2. An instrument for the production of a beam of light of varying characteristics comprising in combination a source of light, a series of lenses so disposed that a beam of light from said source passes through them seriatim, a reflecting surface inclined to the axis of said lenses, a slide formed with an aperture and supporting at least one of said lenses and means whereby said slide may be moved in order to bring either said aperture or said lenses supported by said slide into the path of said beam of light, a secondary slide mounted in said first mentioned slide and a graticule mounted in said secondary slide.

CHARLES HENRY KEELER.